US006639951B1

United States Patent
Katoh et al.

(10) Patent No.: US 6,639,951 B1
(45) Date of Patent: Oct. 28, 2003

(54) DIGITAL DEMODULATOR

(75) Inventors: Hisakazu Katoh, Tokyo (JP); Akinori Hashimoto, Tokyo (JP); Tomohiro Saito, Tokyo (JP); Fumiaki Minematsu, Tokyo (JP); Kenichi Shiraishi, Yokohama (JP); Akihiro Horii, Zama (JP); Shoji Matsuda, Machida (JP); Soichi Shinjo, Machida (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/554,689

(22) PCT Filed: Dec. 25, 1998

(86) PCT No.: PCT/JP98/05950
§ 371 (c)(1),
(2), (4) Date: May 18, 2000

(87) PCT Pub. No.: WO99/34570
PCT Pub. Date: Jul. 8, 1999

(30) Foreign Application Priority Data

Dec. 26, 1997 (JP) .............................................. 9-366907

(51) Int. Cl.[7] .............................................. H04L 27/14
(52) U.S. Cl. ...................................... 375/326; 375/329
(58) Field of Search .............................. 375/326, 327, 375/328, 332, 339, 344, 345, 376, 373; 455/136, 138, 164.2, 164.1, 192.1, 192.2

(56) References Cited

U.S. PATENT DOCUMENTS

| 4,940,951 | A | * | 7/1990 | Sakamoto | 331/4 |
| 4,949,356 | A | * | 8/1990 | Long | 375/332 |
| 5,579,346 | A | * | 11/1996 | Kanzaki | 375/344 |
| 5,656,971 | A | * | 8/1997 | Gotoh | 329/308 |
| 5,838,797 | A | * | 11/1998 | Iwasaki | 380/270 |
| 5,943,369 | A | * | 8/1999 | Knutson et al. | 375/326 |
| 5,987,078 | A | * | 11/1999 | Kiyanagi et al. | 375/344 |

FOREIGN PATENT DOCUMENTS

| JP | 53-137657 | 12/1978 |
| JP | 2-192252 | 7/1990 |
| JP | 6-30073 | 2/1994 |
| JP | 9-186730 | 7/1997 |
| JP | 10-56486 | 2/1998 |
| JP | 10-341263 | 12/1998 |

* cited by examiner

Primary Examiner—Chi Pham
Assistant Examiner—Emmanuel Bayard
(74) Attorney, Agent, or Firm—Eric J. Robinson; Robinson Intellectual Property Law Office, P.C.

(57) ABSTRACT

A digital demodulator that eliminates the need for an absolute phase circuit is provided. In a digital demodulator for a digital broadcasting receiver that receives digital time-division multiplexed signals of different types of modulation, the demodulated baseband signal is selectively inverted by an inverter (7) according to an inversion command signal "0" or "1" that is output from an inversion decision circuit (6) depending on a BPSK signal of a known pattern. A phase error detector (8) for carrier reproduction determines the phase error voltage based on the phase difference between the absolute phase and the phase of the signal point of the demodulated baseband signal output from the inverter (7). The phase error voltage is passed through a carrier filter (9), including a low-pass filter, to control the carrier frequency so that carrier reproduction can be carried out with the phase at the signal point being coincident with the point of phase convergence.

2 Claims, 5 Drawing Sheets

| START FRAME (1) $W_1, W_2$ | SECOND FRAME (2) $W_1, W_3$ | THIRD FRAME (3) $W_1, W_3$ | FOURTH FRAME (4) $W_1, W_3$ | FIFTH FRAME (5) $W_1, W_3$ | SIXTH FRAME (6) $W_1, W_3$ | SEVENTH FRAME (7) $W_1, W_3$ | EIGHTH FRAME (8) $W_1, W_3$ |
|---|---|---|---|---|---|---|---|

DIGITAL DEMODULATOR

TECHNICAL FIELD

The present invention relates to a digital demodulator used with a digital broadcasting receiver for receiving BS digital broadcasting programs, and more particularly to a digital demodulator used with a digital broadcasting receiver for receiving time-multiplexed waves which were digitally modulated by a plurality of modulation methods having different necessary C/N (a ratio of carrier power to noise power) values.

BACKGROUND ART

In a BS digital broadcasting method, a hierarchical transmission method of repetitively transmitting, one frame after another, time-multiplexed digital main signals which were modulated by a plurality of modulation methods having different necessary C/N values, such as 8PSK modulated waves, QPSK modulated waves, and BPSK modulated waves, in addition to burst symbol signals inserted in the main signals and capable of being received at a low C/N value. The burst symbol signal is a signal which was BPSK modulated by a known PN code.

In such a hierarchical transmission method, a frame sync pattern and a superframe identification signal have predetermined patterns which were BPSK modulated. A digital demodulator of a digital broadcasting receiver performs absolute phasing which makes the reception phase be coincident with the transmission phase, in order to decode the demodulated baseband signal by a decoder or to perform other operations. In the hierarchical transmission method, a frame sync signal, a TMCC signal for transmission and multiplexing configuration control to be described later and a burst symbol signal are BPSK demodulated, and the absolute phasing is performed in accordance with the reception phase of the received frame sync pattern (absolute phase reception, inverse phase reception).

However, a necessary circuit area of an integrated digital demodulator becomes large because of the presence of an absolute phasing circuit.

An object of the invention is to provide a digital demodulator which does not require an absolute phasing circuit.

DISCLOSURE OF THE INVENTION

The invention provides a digital demodulator for a digital broadcasting receiver for receiving digital modulated waves multiplexed in time axis by a plurality of modulation methods, comprising:

inverter means for selectively inverting demodulated baseband signals in accordance with a BPSK signal having a known pattern prepared in advance; and carrier reproduction phase error detector means provided with a phase error table having a phase converging point as an absolute phase, the carrier reproduction phase error detector means outputting a phase error signal corresponding to a phase difference between a phase obtained from a signal point of the demodulated baseband signals output from the inverter means and a phase of the phase converging point, wherein carrier reproduction is executed by controlling a frequency of a reproduction carrier so as to make the phase of the signal point become coincident with the phase converging point.

According to the digital demodulator of this invention, the demodulated baseband signals are selectively inverted in accordance with the phase of the BPSK signal having the known pattern prepared in advance. Therefore, the reference point of the demodulated baseband signals selectively inverted takes an absolute phase. The reference point of the demodulated baseband signals not inverted takes also the absolute phase. The carrier reproduction phase error detector means refers to the phase error table, and outputs a phase error signal corresponding to a phase difference between the phase obtained from a signal point of the demodulated baseband signals selectively inverted and the phase of the phase converging point of the absolute phase. The carrier reproduction is executed by controlling the frequency of the reproduction carrier so as to make the phase of the signal point become coincident with the phase converging point. The phase point of the reception signal is therefore converged to the absolute phase and the reception signal is subjected to the absolute phasing. An absolute phasing circuit is therefore unnecessary.

The digital demodulator of this invention further comprises the carrier filter of a low-pass filter, the carrier filter being input with the phase error signal from the carrier reproduction phase error detector means and stopping a filtering operation during a TMCC section, and a BPSK signal section, a QPSK signal section and an QPSK signal section of main signals, and the carrier reproduction being executed in accordance with an output of the carrier filter.

The digital demodulator of this invention is provided with the carrier filter of a low-pass filter whose filtering operation stops during the TMCC section, and the BPSK signal section, a QPSK signal section and an 8PSK signal section of the main signals. Although the phases of the demodulated baseband signals during the BPSK signal section, QPSK signal section and 8PSK signal section of the main signals are compared with the absolute phase, the filtering operation of the carrier filter stops during these signal sections and any practical problem will not occur.

EMBODIMENT OF THE INVENTION

An embodiment of a digital demodulator according to the invention will be described.

Figure 1:
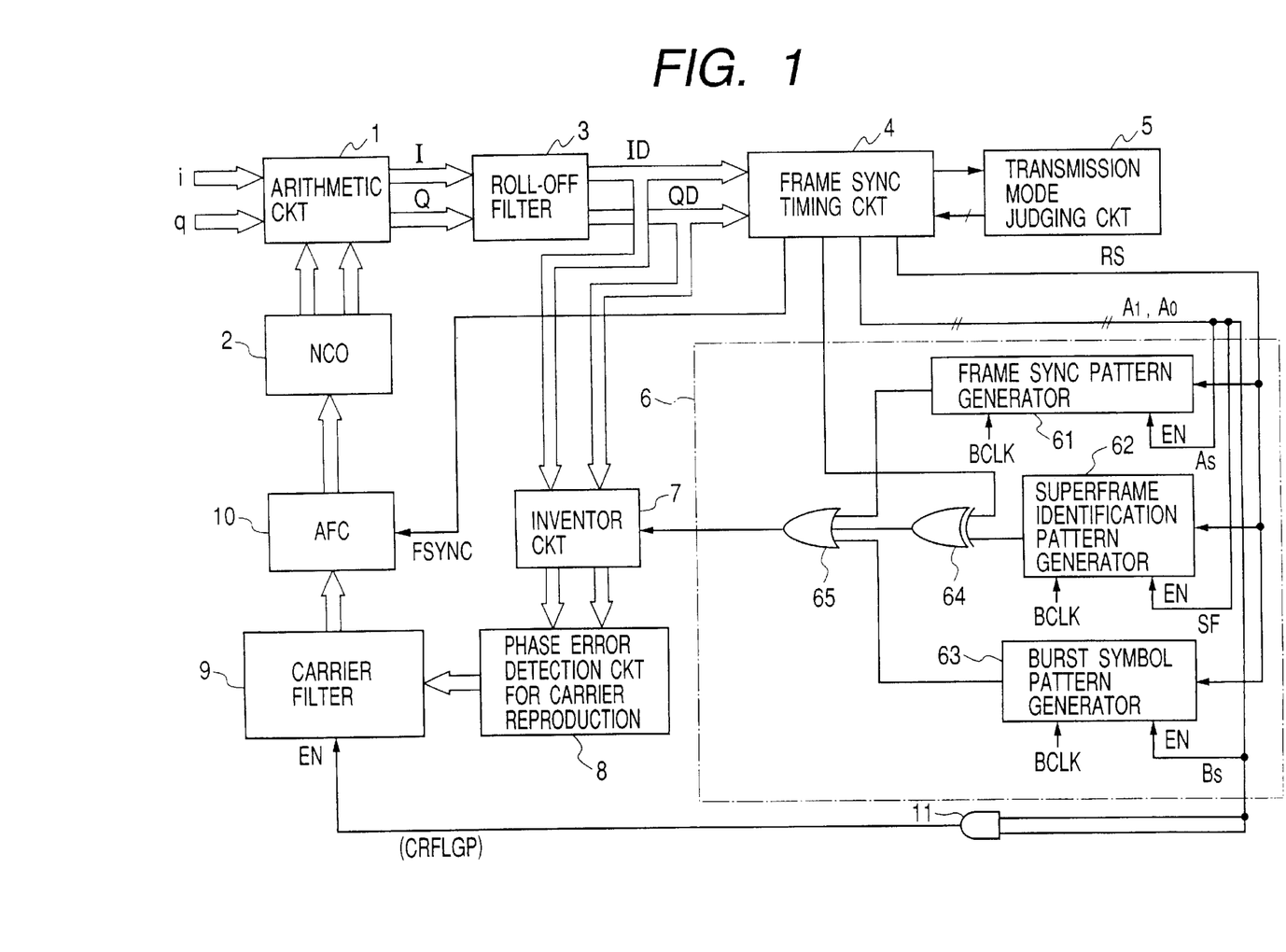
FIG. 1 is a block diagram showing the structure of a digital modulator according to an embodiment of the invention.

FIG. 1 is a block diagram showing the structure of the digital demodulator of the embodiment.

Figure 2A:
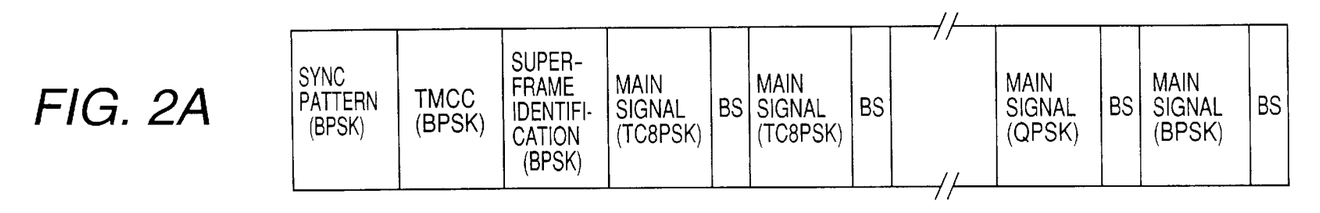
FIGS. 2(A)–2(G) are a diagram showing the structure of a frame used by the digital modulator of the embodiment and waveforms of signals Rs, A1, A0, As, Bs and SF.

Prior to describing the digital demodulator according to the embodiment of the invention, the structure of a frame used by the hierarchical transmission system will be described. FIG. 2(a) is a diagram showing an example of the frame structure used by the hierarchical transmission system. One frame is constituted of one header of 192 symbols and a plurality of pairs of 203 symbols and 4 symbols, totaling in 39936 symbols.

More specifically, one frame is constituted of: a frame sync pattern (BPSK) of 32 symbols (of 32 symbols, front 20 symbols are used); a transmission and multiplexing configuration control (TMCC) pattern (BPSK) of 128 symbols for transmission multiplexing configuration identification; a superframe identification information pattern of 32 symbols (of 32 symbols, front 20 symbols are used); a main signal (TC8PSK) of 203 symbols and a burst symbol signal of 4 symbols (indicated by BS in FIG. 2(a)) to be BPSK modulated by a pseudo-random signal set per each frame period; a main signal (TC8PSK) of 203 symbols and a burst symbol signal of 4 symbols; a main signal (QPSK) of 203 symbols and a burst symbol signal of 4 symbols; and a main signal (BPSK) of 203 symbols and a burst symbol signal of 4 symbols, respectively arranged in this order 8 frames are called a superframe and the superframe identification information pattern is used for identifying the superframe.

Referring back to FIG. 1, the digital demodulator according to the embodiment of the invention will be described. The digital modulator of the embodiment has an arithmetic circuit 1, a numerical control oscillator 2, a roll-off filer 3 made of a digital filter having the raised cosine characteristics, a frame sync timing circuit 4, a transmission mode judging circuit 5, an inversion command signal generator circuit 6 for generating an inversion command signal of "0" or "1" in accordance with a BPSK signal having a known pattern; an inverter circuit 7 for inverting the demodulated baseband signals ID and QD at the same time when necessary, in response to the inversion command signal output from the inversion command signal generator circuit 6; a carrier reproduction phase error detector circuit 8 having a carrier reproduction phase error table with a phase converging point at the absolute phase; a carrier filter 9 of a low-pass digital filter, an AFC circuit 10, and an AND circuit 11 for controlling the operation of the carrier filter 9.

Figure 3:
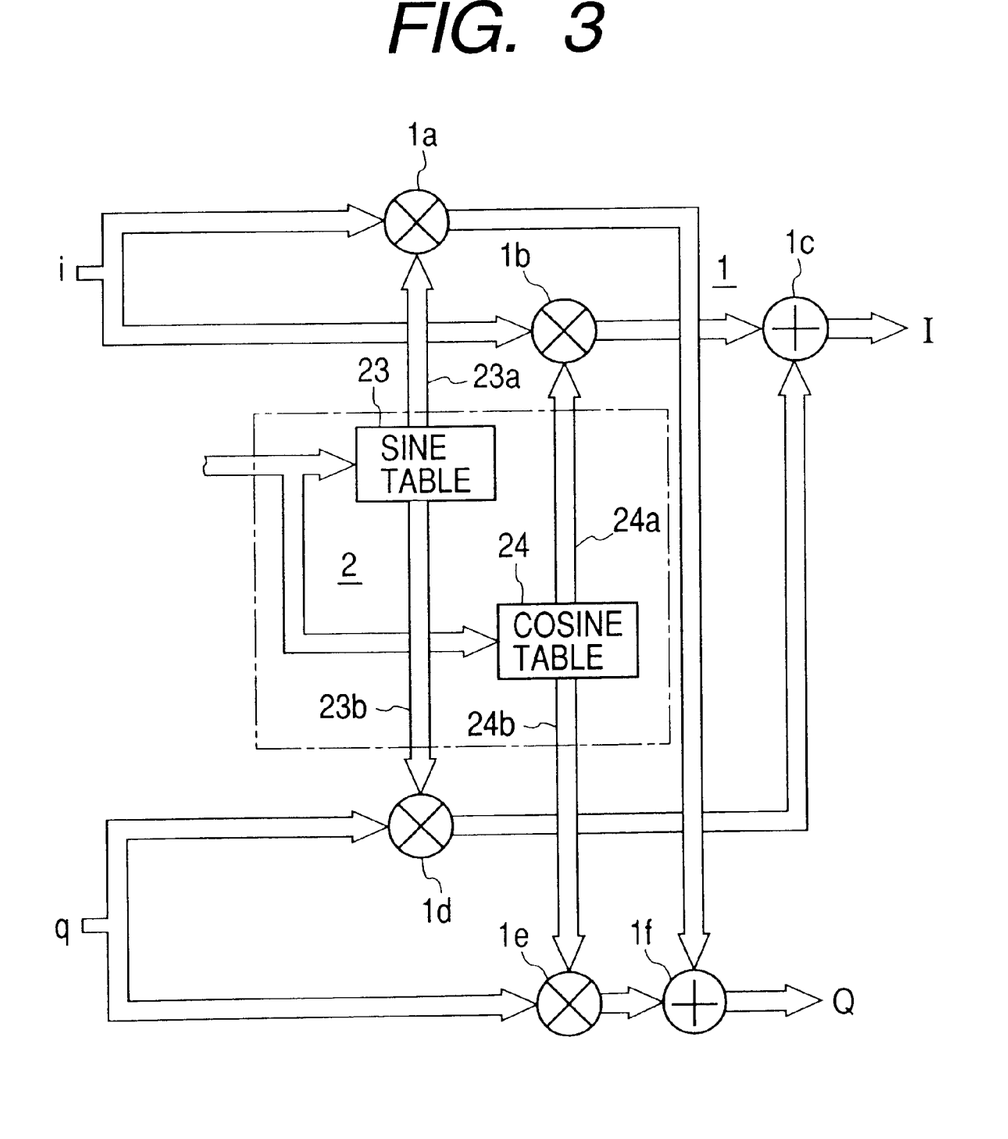
FIG. 3 is a block diagram showing the structure of an arithmetic circuit and a numerical control oscillator of the digital demodulator of the embodiment.

As shown in FIG. 3, the numerical control oscillator 2 has a sine table 23 for outputting sine data 23a and 23b of opposite polarities and a cosine table 24 for outputting cosine data 24a and 24b. In accordance with the output from the AFC circuit 10, the numerical control oscillator 2 outputs the sine data 23a and 23b and cosine data 24a and 24b of opposite polarities, to output sine and cosine signals of opposite polarities which substantially form reproduction carriers in cooperation with the AFC circuit 10.

Figure 2B:
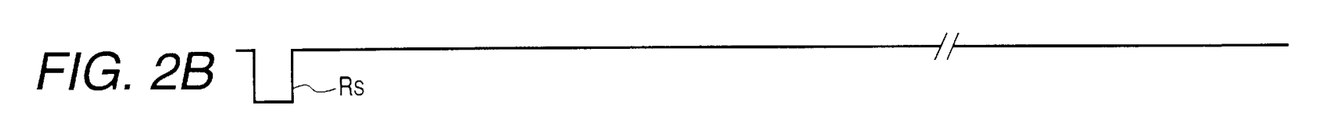
Figure 2C:
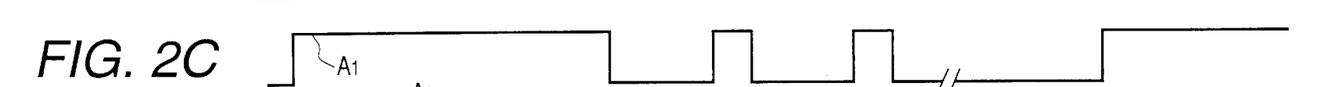
Figure 2D:
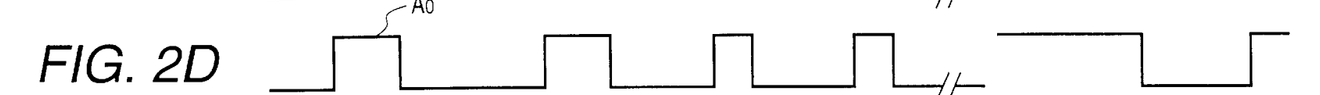
Figure 2E:
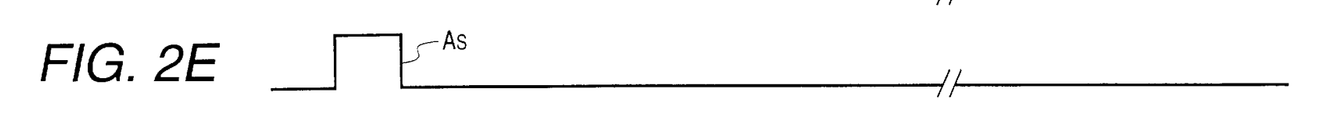
Figure 2F:
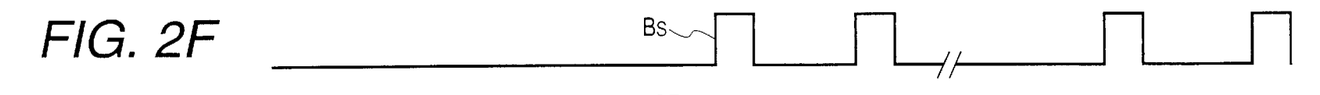
Figure 2G:
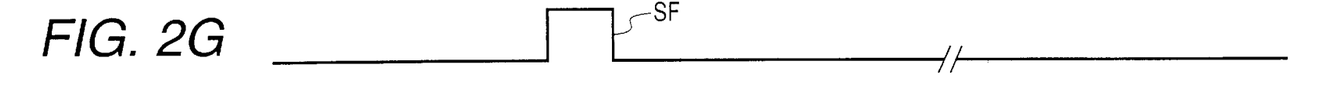

The arithmetic circuit 1 has as shown in FIG. 3: a multiplier 1a for multiplying a quasi-sync detected 1 axis baseband signal i by the sine data 23a; a multiplier 1b for multiplying the baseband signal i by the cosine data 24a; a multiplier 1d for multiplying a quasi-sync detected Q axis baseband signal q by the opposite polarity sine data 23b; a multiplier 1e for multiplying the baseband signal q by the cosine data 24b; an adder 1c for adding outputs of the multipliers 1b and 1d and outputting the addition result as a baseband signal 1; and an adder If for adding outputs of the multipliers 1a and 1e and QPSK signal section, a signal As shown in FIG. 2(E) which takes the high level during the frame sync pattern section, a signal Bs shown in FIG. 2(F) which takes the high level during the burst symbol signal section, and a signal SF shown in FIG. 2(G) which takes the high level during the superframe identification pattern section.

Figure 4A:
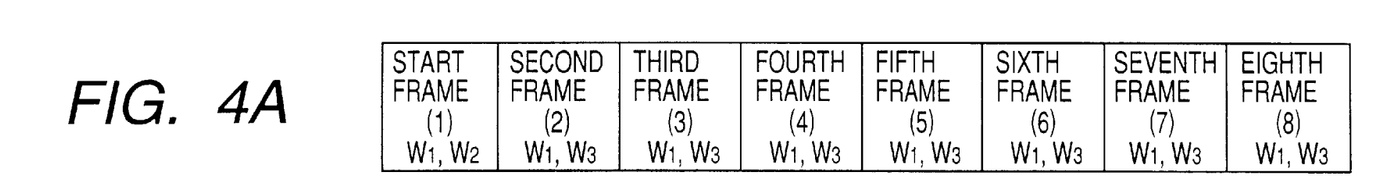
FIGS. 4(A) and 4(B) are a diagram illustrating a superframe identification pattern in a frame of a signal supplied to the digital demodulator of the embodiment.
Figure 4B:
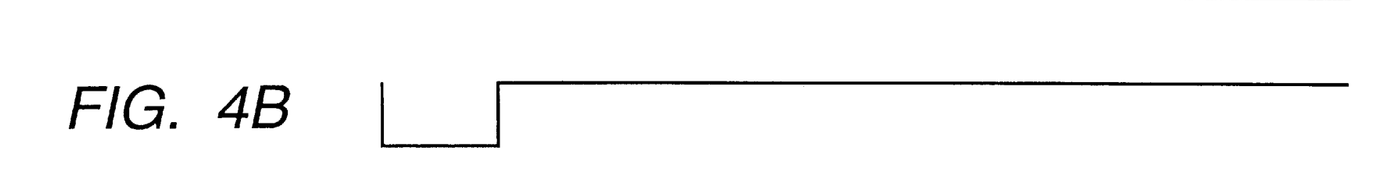

Next, the superframe identification pattern will be described. FIG. 4(A) is a diagram showing the superframe identification pattern. $W_1$ represents the frame sync pattern, and takes the same pattern for all frames. In FIGS. 4(A) and 4(B), patterns $W_2$ and $W_3$ represent the superframe identification patterns including the frame sync pattern and superframe identification pattern extracted from each frame. The pattern $W_2$ is used as the superframe identification pattern for the first frame, and the pattern $W_3$ is used as the superframe identification pattern for all seven other frames from the second to eighth frames. The pattern $W_3$ is an inverse pattern of the pattern $W_2$.

The frame sync timing circuit 4 outputs a superframe identification pattern identification signal which identifies the superframe identification pattern taking the low level during the section of the superframe identification pattern $W_2$ of the start frame shown in FIG. 4(B) and the high level during the section of the superframe identification pattern $W_3$ of the following seven frames.

The inversion command signal generator circuit 6 has a frame sync pattern generator circuit 61, a superframe identification pattern outputting the addition result as a baseband signal Q. The arithmetic circuit 1 therefore tunes the frequencies of the baseband signals i and q and outputs the frequency tuned baseband signals i and Q to the roll-off filter 3.

Upon reception of baseband signals ID and QD output from the roll-off filter 3, the frame sync timing circuit 4 outputs a TMCC pattern to the transmission mode judging circuit 5. In accordance with the decoded result of the TMCC pattern, the transmission mode judging circuit 5 supplies the frame sync timing circuit 4 with a 2-bit transmission mode signal representing a high hierarchical 8PSK signal (demodulated from the 8PSK modulated signal); a low hierarchical QPSK signal (demodulated from the QPSK modulated signal); and a low hierarchical BPSK signal (demodulated from the BPSK modulated signal).

The frame sync timing circuit 4 receives the baseband signals ID and QD to detect a sync pattern and output a frame sync signal FSYNC to the AFC circuit 10 which executes an AFC operation for each frame, and also receives the transmission mode signal from the transmission mode judging circuit 5 to output: a signal Rs shown in FIG. 2(B) which synchronizes with the start of the frame sync pattern; a signal A1 shown in FIG. 2(C) which takes a high level during the BPSK signal section; a signal A0 shown in FIG. 2(D) which takes the high level during a frame sync pattern section, a superframe identification pattern section, a burst symbol signal section and a generator circuit 62, a burst symbol pattern generator circuit 63, an exclusive OR circuit 64, and an OR gate circuit 65 which outputs the inversion command signal.

The frame sync pattern generator circuit 61 is reset by the signal Rs and receives as the enable signal the signal As, i.e., the signal output during the frame sync pattern section. Synchronously with a bit clock signal, the frame sync pattern generator circuit 61 sequentially outputs via the OR gate circuit 65 the signal constituting the frame sync pattern as the inversion command signal. For example, the inversion command signal takes a bit "1" to enable the inversion command.

The superframe identification pattern generator circuit 62 is reset by the signal Rs and receives as the enable signal the signal SF, i.e., the signal output during the superframe identification pattern section. Synchronously with the bit clock signal, the superframe sync pattern generator circuit 62 sequentially outputs the superframe identification pattern $W_2$ constituting the start frame to the exclusive OR circuit 64. The pattern $W_2$ is subjected to the exclusive OR operation with the superframe identification pattern identification signal output from the frame sync timing circuit 4 and the result is supplied to the OR gate circuit 65. In accordance with the superframe identification pattern identification signal, the exclusive OR circuit 64 outputs the superframe identification pattern $W_2$ for the start frame, and the pattern $W_3$ inverted from the pattern $W_2$ for the following seven frames. Therefore, the exclusive OR circuit 64 outputs the superframe identification pattern signals $W_2$, $W_3$, $W_3$, $W_3$, $W_3$, $W_3$, $W_3$, and $W_3$ shown in FIG. 4(A) for the frames from the start to eighth frames via the OR gate circuit 65 as the inversion command signals. For example, the inversion command signal takes a bit "1" to enable the inversion command.

The burst symbol pattern generator circuit 63 is reset by the signal Rs and receives as the enable signal the signal Bs, i.e., the signal output during the burst symbol pattern section. Synchronously with the bit clock signal, the burst symbol generator circuit 63 sequentially outputs via the OR gate circuit 65 the burst symbol signal as the inversion command signal. The burst symbol pattern generator circuit 63 therefore outputs the burst symbol signal as the inversion command signal. For example, the inversion command signal takes a bit "1" to enable the inversion command.

Therefore, the inversion command signal generator circuit 6 outputs the frame sync pattern signal as the inversion command signal "1" during the frame sync pattern section, outputs as the inversion command signal the signal "1" of the signal shown in FIG. 4(A) corresponding to each frame during the superframe identification pattern section, and outputs as the inversion command signal the burst symbol signal "1" during the burst symbol pattern section.

In accordance with the inversion command signal output from the inversion command signal generator circuit 6, the inverter circuit 7 inverts the baseband signals ID and QD output from the roll-off filer 3 at the same time when necessary. More specifically, when the inversion command signal takes the low level, the baseband signals ID and QD are directly sent to the carrier reproduction phase error detector circuit 8, whereas when the inversion command signal takes the high level, the baseband signals ID and QD are inverted at the same time and sent to the carrier reproduction phase error detector circuit 8.

Upon reception of the baseband signals ID and QD via the inverter circuit 7, the carrier reproduction phase error detector circuit 8 detects a phase error between the phase calculated from the signal point of the baseband signals ID and QD and the absolute phase to thereby output a phase error voltage corresponding to the phase error.

Figure 5A:
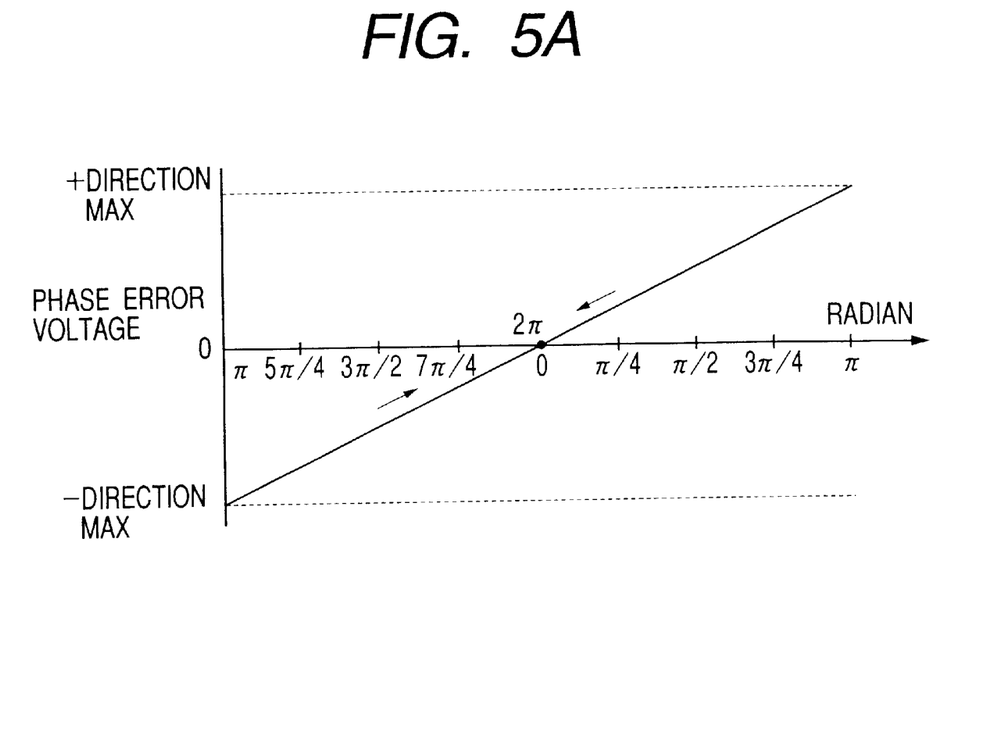
FIGS. 5(A) and 5(B) are a phase error table used by the digital demodulator of the embodiment.

More specifically, the carrier reproduction phase error detector circuit 8 has a carrier reproduction phase error table shown in FIG. 5(A) with the phase converging point (0 ($2\pi$) radian) of the absolute phase. The phase is obtained from the signal point of the baseband signals ID and QD supplied from the inverter circuit 7, and the phase error voltage corresponding to the phase is obtained from the carrier reproduction phase error table and supplied to the carrier filter 9.

The reference point of the phase of the signal point of the baseband signals ID and QD output from the roll-off filter is either 0 ($2\pi$) radian or $\pi$ radian. However, if the signal output from the inversion command signal generator circuit 6 as the inversion command signal during the frame sync pattern section, superframe identification pattern section or burst symbol section takes the high level, the baseband signals ID and QD output from the roll-off filter 3 are inverted at the same time and the reference point of the phase of the signal point of the inverted baseband signals ID and QD is 0 ($2\pi$) radian. Conversely, if the signal output from the inversion command signal generator circuit 6 as the inversion command signal during the frame sync pattern section, superframe identification pattern section or burst symbol section takes the low level, the baseband signals ID and QD output from the roll-off filter 3 are not inverted but are directly output from the inverter circuit 7 and the reference point of the phase of the signal point of the inverted baseband signals ID and QD is 0 ($2\pi$) radian.

Figure 5B:
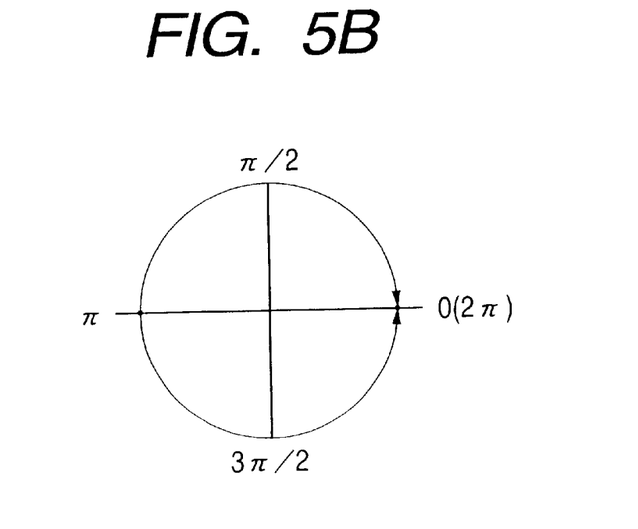

Therefore, the reference point of the phase obtained from the signal point of the baseband signals ID and QD input to the carrier reproduction phase error detector circuit is 0 ($2\pi$) radian, so that the phase error can be detected from the carrier reproduction phase error table shown in FIGS. 5(A) and 5(B).

If the phase obtained from the signal point of the baseband signals ID and QD input from the inverter circuit 7 has a phase in the increase direction from $\pi$ radian or larger to 0 ($2\pi$) radian, a negative phase error voltage shown in FIGS. 5(A) and 5(B) is output, whereas if the phase has a phase in the decrease direction from smaller than $\pi$ radian to 0 ($2\pi$) radian, a positive phase error voltage shown in FIGS. 5(A) and 5(B) is output. This phase error voltage is supplied to the AFC circuit 10. Under the control of the AFC circuit 10, the phase obtained from the signal point is converged to 0 ($2\pi L$) as shown in FIG. 5(B). In this case, the phase error voltage takes a plus direction maximum value or minus direction maximum value at the phase of $\pi$ radian.

The phase error voltage corresponding to the phase obtained from the signal point of the baseband signals ID and QD and output from the carrier reproduction phase error detector circuit 8 is supplied to the carrier filer 9 of the digital low-pass filter and smoothed. In the case of the minus direction, the signal obtained through the logical AND of the signals A1 and A0 by the AND circuit 11 is supplied as a carrier filter control signal (CRFLGP), and the carrier filer 9 executes a filtering operation only during the frame sync pattern section, superframe identification pattern section and burst symbol signal section. During the BPSK signal section, QPSK signal section and 8PSK signal section of the main signals, the low level signal is output from the AND circuit 11 to stop the filtering operation of the carrier filter 9. Therefore, the output of the carrier filter 9 is maintained at the output immediately before the filtering operation is stopped. The output of the carrier filer 9 is supplied as a tuning voltage to the AFC circuit 10.

As the baseband signals of the main signals during the BPSK signal section, QPSK signal section and 8PSK signal section are supplied to the carrier reproduction phase error detector circuit 8, the phase error voltage is detected from the carrier reproduction phase error table (refer to FIGS. 5(A) and 5(B)) having the reference point of 0 ($2\pi$) radian. However, in this case, the carrier filter 9 is disabled so that any practical problem will not occur.

The operation of the digital demodulator constructed as above according to the embodiment of the invention will be described.

In a BS digital broadcasting receiver, generally, a desired signal in a designated channel is scanned by the AFC circuit 10 to capture the carrier. In the digital demodulator according to the embodiment of the invention, upon reception of a desired signal, the baseband signals I and Q orthogonally demodulated by the quasi-detection method are supplied to the arithmetic circuit 1 which calculates the baseband signals I and Q by using the output data from the numerical control oscillator 2 and converts the signals I and Q into the baseband signals I and Q.

The baseband signals I and Q are supplied to the roll-off filter 3 which outputs the baseband signals ID and QD. The baseband signals ID and QD are supplied via the inverter circuit 7 to the carrier reproduction phase error detector circuit 8 which obtains the carrier reproduction phase error voltage in accordance with the phase corresponding to the signal point of the baseband signals ID and QD supplied via the inverter circuit 7. The phase error voltage is smoothed by the carrier filter 9 and supplied as the tuning voltage to the AFC circuit 10. An output of the AFC circuit 10 is supplied to the numerical control oscillator 2 to reproduce the carrier by controlling the carrier frequency to make the phase error voltage become zero.

The baseband signals ID and QD are also supplied to the frame sync timing circuit 4 which detects the frame sync pattern to capture the frame sync and establish the frame timing. The time sequential positions of the frame sync pattern, TMCC pattern, superframe identification pattern and burst symbol signals are therefore identified. The TMCC pattern is sent to the transmission mode judging circuit 5 and decoded. Upon reception of the transmission mode signal output from the transmission mode judging circuit 5, the frame sync timing circuit 4 outputs the signals Rs, A1, A0, As, Bs and SF.

Upon reception of the signals Rs, As, Bs and SF and superframe identification pattern identification signal sent from the frame sync timing circuit 4, the inversion command signal generator circuit 6 identifies the reception phase points at respective timings from the phases and timings of the frame sync pattern signal, superframe identification pattern signal and burst symbol signal, and outputs the inversion command signals having the high or low level to be determined from the reception phase point, to the inverter circuit 7.

Upon reception of the inversion command signal, the inversion circuit 7 supplies the baseband signals ID and QD without inverting them to the carrier reproduction phase error detector circuit 8 if the inversion command signal has the low level, whereas it supplies the baseband signals ID and QD by inverting them to the carrier reproduction phase error detector circuit 8 if the inversion command signal has the high level. In this manner, the reference phase of the phase obtained from the signal point of the baseband signals ID and QD output from the inverter circuit 7 is fixed to 0 ($2\pi$) radian and thereafter the baseband signals ID and QD are supplied to the carrier reproduction phase error detector circuit 8.

In the carrier reproduction phase error detector circuit 8 which are supplied with the baseband signals ID and QD from the inverter circuit 7, the phase error voltage corresponding to the phase obtained from the signal point of the baseband signals ID and QD and the converging point of 0 ($2\pi$) of the phase error table shown in FIGS. 5(A) and 5(B) is obtained and supplied to the carrier filter 9.

In this case, the logical AND output of the signals A1 and A0, i.e., the signal having the high level during the frame sync pattern section, superframe identification pattern section and burst symbol signal section, is output as the carrier filter control signal (CRFLGP). During the period while the carrier filter control signal (CRFLGP) takes the high level, the phase error voltage is smoothed by the carrier filer 9 whose output is supplied to the AFC circuit 10. The AFC circuit 10 controls the frequency of the carrier in accordance with the output of the carrier filer 9 to thereby perform carrier reproduction through burst signal reception.

During the BPSK signal section, QPSK signal section and 8PSK signal section of the main signals, the carrier filter control signal (CRFLGP) takes the low level. During the period while the carrier filter control signal (CRFLGP) takes the low level, the filtering operation stops and an output of the carrier filter 9 is maintained at the output immediately before the filtering operation stops to thereafter execute carrier reproduction.

As described above, in the digital demodulator of the embodiment, the carrier reproduction is performed in accordance with the phase error voltage obtained from the phase error table having one converging point. Therefore, the phase point of the reception signal is converted into one phase point and the reception signal is subjected to the absolute phasing. It is therefore unnecessary to use an absolute phasing circuit. The necessary area for an integrated digital demodulator can be reduced.

As the baseband signals of the main signals during the BPSK signal section, QPSK signal section and 8PSK signal section are supplied to the carrier reproduction phase error detector circuit 8, the phase error voltage is detected from the carrier reproduction phase error table having the reference point of 0 ($2\pi$) (refer to FIGS. 5(A) and 5(B)). However, in this case, the carrier filter 9 is disabled so that any practical problem will not occur as described earlier. Data may be output as a portion of the burst signal. In this case, the section not outputting the data is used.

In this embodiment, the demodulated baseband signals ID and QD are inverted at the same time when necessary by the inverter circuit 7 in accordance with the inversion command signal. Instead, the carrier reproduction phase error detector circuit may be provided with the phase error table shown in FIGS. 5(A) and 5(B) and a phase error table having the phase converging point of $\pi$ radian. In this case, the inverter circuit 7 can be omitted by selecting either the phase error table shown in FIGS. 5(A) and 5(B) or the phase error table having the phase converging point of $\pi$ radian, in accordance with the inversion command signal "0" or "1".

INDUSTRIAL APPLICABILITY

As described above, according to the digital demodulator of this invention, the carrier reproduction is performed in accordance with the phase error corresponding to the phase of the reception signal detected by using the phase error table having one converging point, during the period while a signal having a known pattern is received. Therefore, the reception signal can be subjected to the absolute phasing, an absolute phasing circuit is unnecessary, and the necessary area for an integrated digital demodulator can be reduced.

What is claimed is:

1. A digital demodulator for a digital broadcasting receiver for receiving digital modulated waves multiplexed in the time axis by a plurality of modulation methods, comprising:
    inverter means for selectively inverting demodulated baseband signals in accordance with a BPSK signal having a known pattern prepared in advance; and
    carrier reproduction phase error detector means provided with a phase error table having a phase converging point as an absolute phase, said carrier reproduction phase error detector means outputting a phase error signal corresponding to a phase difference between a phase obtained from a signal point of the demodulated baseband signals output from said inverter means and a phase of the phase converging point,
    wherein carrier reproduction is executed by controlling a frequency of a reproduction carrier so as to make the phase of the signal point become coincident with the phase converging point.

2. A digital demodulator according to claim 1, further comprising a carrier filter of a low-pass filter, said carrier filter being input with the phase error signal from said carrier reproduction phase error detector means and stopping a filtering operation during a BPSK signal section, a QPSK signal section and an 8PSK signal section of main signals, and the carrier reproduction being executed in accordance with an output of said carrier filter.

* * * * *